Patented Dec. 22, 1925.

1,566,425

UNITED STATES PATENT OFFICE.

WALTER M. RALPH, OF BUFFALO, NEW YORK, ASSIGNOR TO NATIONAL ANILINE & CHEMICAL COMPANY, INC., OF NEW YORK, N. Y., A CORPORATION OF NEW YORK.

4-NITRO-1-ACETNAPHTHALID-6 (OR 7)-MONO-SULPHONIC ACID.

No Drawing.   Application filed November 29, 1920.   Serial No. 427,116.

*To all whom it may concern:*

Be it known that I, WALTER M. RALPH, a citizen of the United States, residing at Buffalo, in the county of Erie, State of New York, have invented certain new and useful Improvements in 4-Nitro-1-Acetnaphthalid-6 (or 7)-Mono-Sulphonic Acid; and I do hereby declare the following to be a full, clear, and exact description of the invention, such as will enable others skilled in the art to which it appertains to make and use the same.

This invention relates to improvements in the manufacture of 4-nitro-1-acetnaphthalid-6 (or 7)-mono-sulphonic acid or nitro-acetyl-Cleve's acid, hereinafter referred to by the latter name.

According to the present invention the mixture of 1-naphthylamine-6-mono-sulphonic acid and 1-naphthylamine-7-mono-sulphonic acid, commonly known as Cleve's acid, and hereinafter referred to by that name, is converted into the mono-acetyl compound (hereinafter referred to as acetyl-Cleve's acid) by heating with glacial acetic acid and sodium acetate. The acetyl-Cleve's acid is nitrated in sulphuric acid solution by means of mixed nitric and sulphuric acids, giving the 4-nitro-1-acetnaphthalid-6-(or 7)-mono-sulphonic acid, hereinafter referred to as nitro-acetyl-Cleve's acid.

The invention includes certain improvements in the various steps of the process, as well as in the process as a whole.

The invention will be further illustrated by the following specific example of the preferred practice:

*Acetylation of Cleve's acid:*—530 pounds of glacial acetic acid are charged into a jacketed silicon iron (Duriron) kettle provided with an agitator. 136 pounds of crystalline sodium acetate or 82 pounds of anhydrous sodium acetate are then added, and finally 223 pounds of dry Cleve's acid (100%). The kettle is then closed, the contents brought to a boil and allowed to reflux, with agitation, for about 24 hours or until the acetylation has taken place. At the end of this time the excess acetic acid is distilled off. The agitation is continued throughout the distillation and the distillation is carried to such a point that a sample removed from the kettle hardens within five minutes to such a point that it may be broken by a sharp blow. The charge in the kettle is then removed, for example, through a bottom discharge opening, into a suitable receptacle, where it is permitted to cool and harden. When the process is thus carried out the product will contain only a very small amount of unacetyphated material, as little as 1 or 2% or less.

This method of acetylating Cleve's acid permits the use of the dry free acid instead of the sodium salt which has been heretofore employed. The method is applicable to the acetylation of other amino aromatic sulphonic acids.

*Nitration of acetyl-Cleve's acid:*—1300 pounds of 66° Bé. sulphuric acid are charged into the nitrating kettle, 287 pounds of acetyl-Cleve's acid in the form of its sodium salt are then added in the form of small lumps, and the mixture is stirred at ordinary temperatures until the acetyl-Cleve's acid is dissolved. This usually requires a considerable period of time, e. g. about 24 hours. During the last 4 hours of this period, air is blown through the solution, with the result that larger yields are obtained than when the blowing with air does not take place. The solution so obtained is then cooled with brine coils to about 0° C., and the nitration is effected by gradually running in 140 pounds of mixed acid containing about 48% sulphuric acid and 46% nitric acid. The average temperature of the nitration is kept at about 5° C., and should not, for best results, be allowed to rise at any time above 10° C. When all of the acid has been added, which may require up to about 5 hours, the stirring is continued for a further period of about 1 hour to insure completion of the nitration.

In a separate vat there are placed about 1700 pounds of soda ash together with a little water and a considerable amount of ice. This vat is provided with efficient means for agitation. The nitration mixture, produced as above described, is introduced gradually into the soda solution, while the temperature is kept below 20° C., and the introduction of the nitration mixture is so carried out, with agitation, that the solution is maintained with an alkaline reaction throughout. After the nitration mixture has all been introduced into the vat, the material in the vat is stirred for a further period, e. g. about 24 hours, during which time the sodium salt of the nitro-acetyl-Cleve's acid is slowly salted out as the sodium salt by the sodium sulphate formed by the neutralization of the sulphuric acid. The precipitated sodium salt of the nitro-acetyl-Cleve's acid is then filtered off together with a considerable amount of sodium sulphate which will also have crystallized out. After filtration this mixture is returned to the same or a different vat, stirred up with just enough water to dissolve the sodium sulphate without dissolving the sodium salt of the nitro-acetyl-Cleve's acid, and again filtered, so that the sodium salt of the nitro-acetyl-Cleve's acid is obtained without admixture of any large quantity of sodium sulphate.

The separation of the nitro-acetyl-Cleve's acid in the manner above described enables the subsequent handling of acid liquors to be avoided, so that the sodium salt of the nitro-acetyl-Cleve's acid can be directly filtered out from a neutralized solution from which it has been separated by the sodium sulphate present. The neutralization of the nitration mixture therefore has the advantage of converting the nitro-acetyl-Cleve's acid into the form of the sodium salt and of salting out this sodium salt by the sodium sulphate which is also formed by the neutralization. The resulting liquors are therefore free from acid and can be much more readily handled than can acid liquors; while the product produced by the present process is one of increased stability, such that it does not require to be immediately used to avoid objectionable change; whereas the sodium salt separated from acid solutions is relatively unstable and undergoes rather rapid change on standing.

The improved process of the present invention is well adapted for the manufacture of 4-nitro-1-acetnaphthalid-6-(or 7)-mono sulphonic acid from Cleve's acid, giving good yields of the nitro-acetyl-Cleve's acid. The method of acetylating Cleve's acid, herein described, is claimed in a divisional application, Serial No. 42,585, filed July 9, 1925.

I claim:

1. The method of producing nitro-acetyl-Cleve's acid, which comprises subjecting acetyl-Cleve's acid in solution in sulphuric acid to nitration with a mixture of nitric and sulphuric acids, and isolating the resulting nitro-acetyl-Cleve's acid in the form of its sodium salt by adding the nitration mixture to sodium carbonate in the presence of water in amount sufficient to effect neutralization, whereby the sodium salt of nitro-acetyl-Cleve's acid is formed and salted out from the solution by the sodium sulphate formed by the neutralization.

2. The method of producing nitro-acetyl-Cleve's acid, which comprises subjecting acetyl-Cleve's acid in solution in sulphuric acid to nitration with a mixture of nitric and sulphuric acids, and isolating the resulting nitro-acetyl-Cleve's acid in the form of its sodium salt by adding the nitration mixture to sodium carbonate in the presence of water in amount sufficient to effect neutralization, whereby the sodium salt of nitro-acetyl-Cleve's acid is formed and salted out from the solution by the sodium sulphate formed by the neutralization, and separating the sodium salt of the nitro-acetyl-Cleve's acid from admixed sodium sulphate by dissolving the sodium sulphate with water without dissolving the sodium salt.

3. The improvement in the nitration of acetyl-Cleve's acid which comprises dissolving the acetyl-Cleve's acid in sulphuric acid and blowing air through the solution, and subsequently nitrating the solution.

4. The method of isolating nitro-acetyl-Cleve's acid from the nitration mixture which comprises adding the nitration mixture to sodium carbonate in the presence of water in sufficient amount to effect neutralization, whereby the sodium salt of nitro-acetyl-Cleve's acid is formed and salted from the solution.

In testimony whereof I affix my signature.

WALTER M. RALPH.